United States Patent [19]

McHugh

[11] 3,899,039
[45] Aug. 12, 1975

[54] BUS HAVING A SEPARATE WHEELED MOTIVE POWER UNIT

[76] Inventor: John McHugh, 15 Cobbs Brow, Newburgh, England

[22] Filed: Feb. 22, 1973

[21] Appl. No.: 334,547

[52] U.S. Cl. ............................. 180/11; 180/14 A
[51] Int. Cl. ............................................ B60d 3/00
[58] Field of Search ..................... 180/11, 12, 14 A

[56] References Cited
UNITED STATES PATENTS

| | | | |
|---|---|---|---|
| 1,387,820 | 8/1921 | Wilcox | 180/11 |
| 1,401,661 | 12/1921 | Wilcox | 180/11 |
| 2,425,948 | 8/1947 | Lucien | 180/11 |
| 2,540,859 | 2/1951 | Birkin | 180/11 |
| 2,962,300 | 11/1960 | Garman | 180/12 X |
| 3,586,119 | 6/1971 | Chuchua | 180/12 X |

FOREIGN PATENTS OR APPLICATIONS

| | | | |
|---|---|---|---|
| 872,006 | 2/1953 | Germany | 180/11 |
| 906,001 | 12/1945 | France | 180/11 |
| 488,356 | 12/1953 | Italy | 180/11 |
| 753,094 | 2/1967 | Canada | 180/11 |

*Primary Examiner*—David Schonberg
*Assistant Examiner*—T. L. Siemens
*Attorney, Agent, or Firm*—Sughrue, Rothwell, Mion, Zinn & Macpeak

[57] ABSTRACT

A bus comprising a wheeled steerable body for accommodating a driver and passengers and a separate wheeled motive power unit coupled to the rear of the body.

2 Claims, 7 Drawing Figures

BUS HAVING A SEPARATE WHEELED MOTIVE POWER UNIT

This invention relates to buses, coaches and the like hereinafter referred to collectively as buses.

Conventional buses have a relatively high floor in order that equipment such as drive lines, fuel tanks, driver axles and transmission may be mounted therebelow with sufficient ground clearance.

Recent specifications have required that the floor height in buses be reduced by about half as compared to conventional buses. Thus a recently proposed U.S. specification demands that the floor height be about 17 inches in contrast to the floor height of about 36 inches found in conventional buses. These requirements render it difficult to accommodate the usual equipment below floor level while maintaining an adequate clearance but a particular problem arises in regard to tyres which in a conventional two-axle bus having a floor height of 36 inches would have a gross diameter of about 40 inches. A conventional two-axle bus having a floor height of only 17 inches could not use the space above the bus wheel positions without the use of steps or the employment of tires above about 29 inches diameter. Tyres of a suitably small diameter would be of insufficient capacity within present commercially available tyre specifications to support the bus with passengers and under-floor equipment.

It is an object of the invention to overcome the above disadvantage. According to the present invention, there is provided a bus comprising a wheeled steerable body for accommodating a driver and passengers and a separate wheeled motive power unit coupled to the rear of the steerable body.

The motive power unit preferably accommodates not only the engine but also the transmission drive axles, batteries, fuel tank, generators, cooling system, air compressor, hydraulic pump and other ancillary equipment.

The provision of a separate motive power unit reduces the noise level and vibration within the passenger accommodating body and the unit may also be insulated to reduce the external noise level.

A further advantage is that inflammable fuels can be isolated from the passenger accommodating body and the fuels may be liquids, gases or solids, but other forms of stored energy can also be utilized for the driving of the motive power unit.

Air-conditioning equipment may be provided in the motive power unit with ducting to the passenger accommodating body interior.

The driver's cab will preferably be in the normal position at the front of the passenger accommodating body, and remote control means are provided for operation of the equipment in the motive power unit.

Embodiments of the present invention will now be described by way of example with reference to the accompanying drawings, in which.

Figure 5:
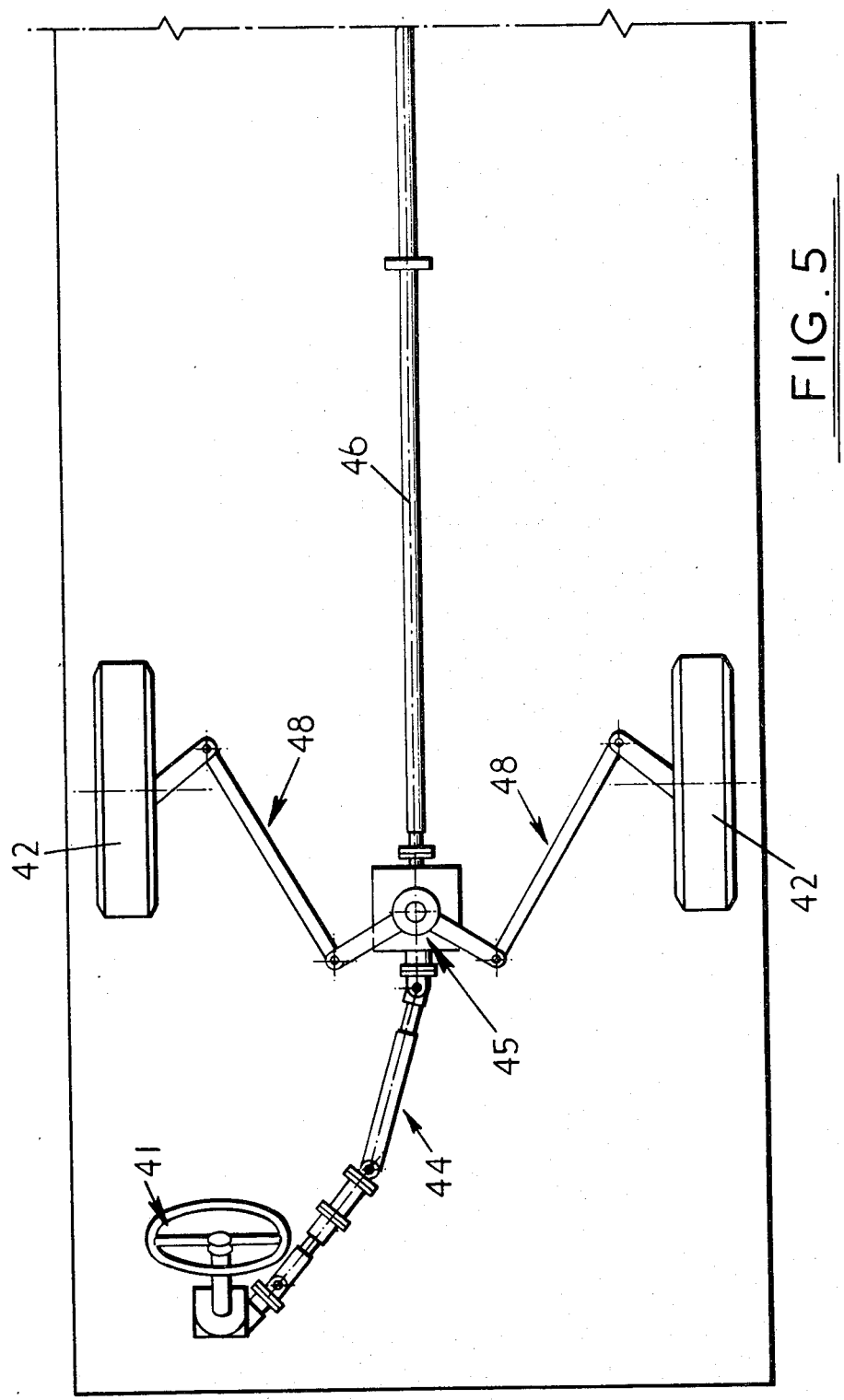
Figure 6:
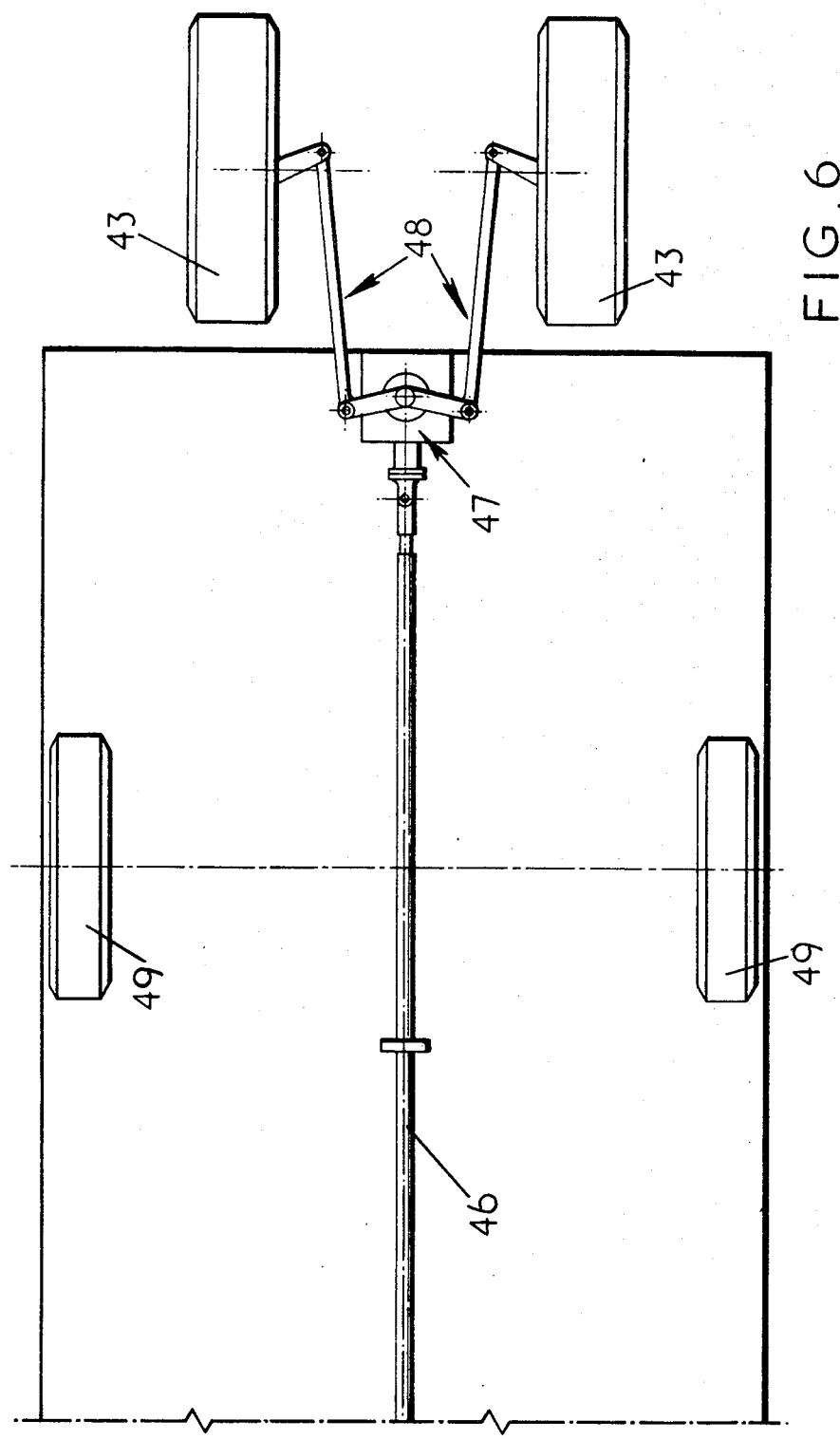
Figure 7:
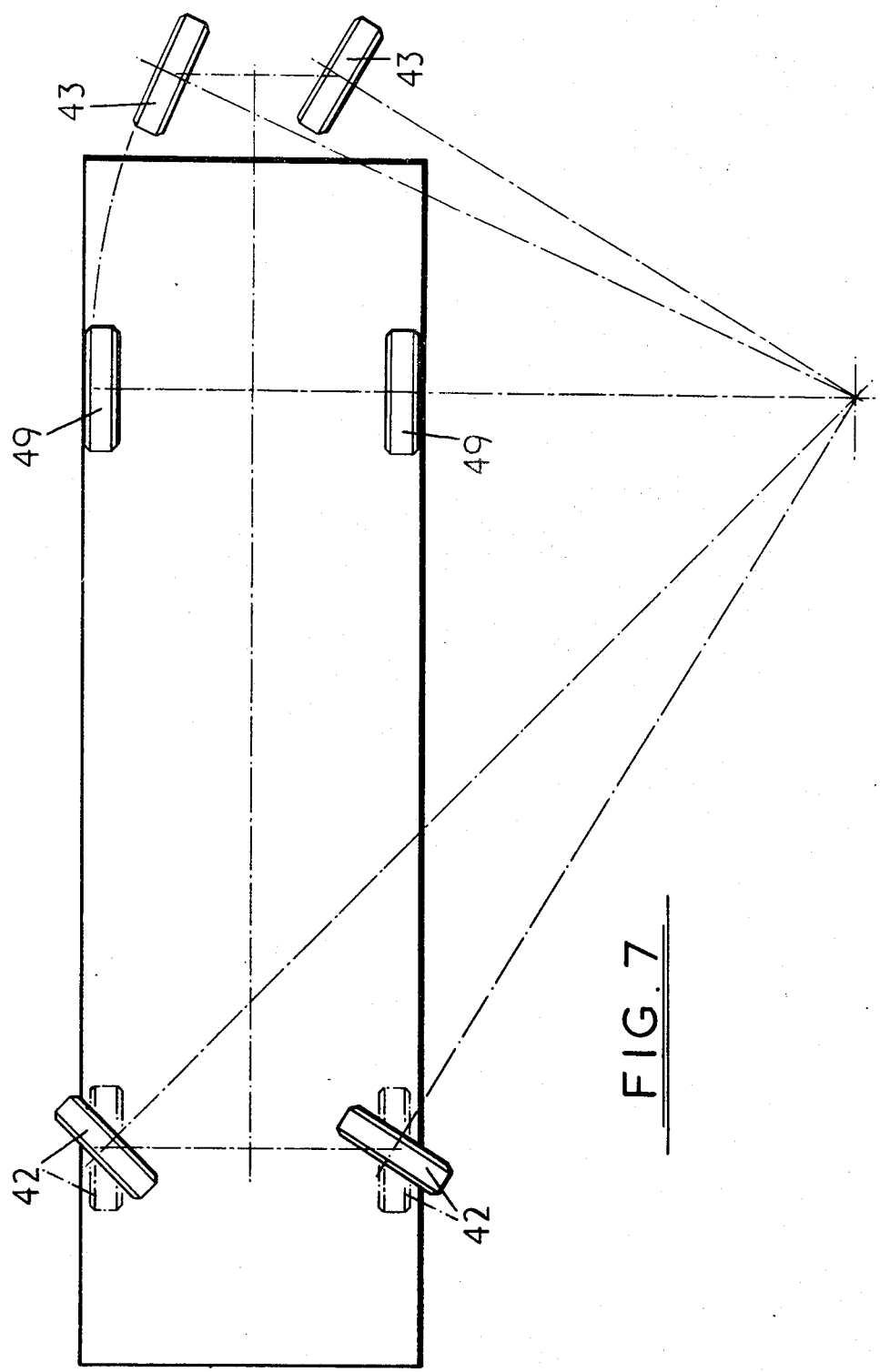

FIGS. 5 and 6 respectively show the front and rear portions of a steering arrangement adapted for use with the first and second embodiments; and FIG. 7 illustrates the disposition whilst turning of the wheels of an embodiment of the present invention provided with a steering arrangement such as is shown in FIGS. 6 and 7.

Figure 1:
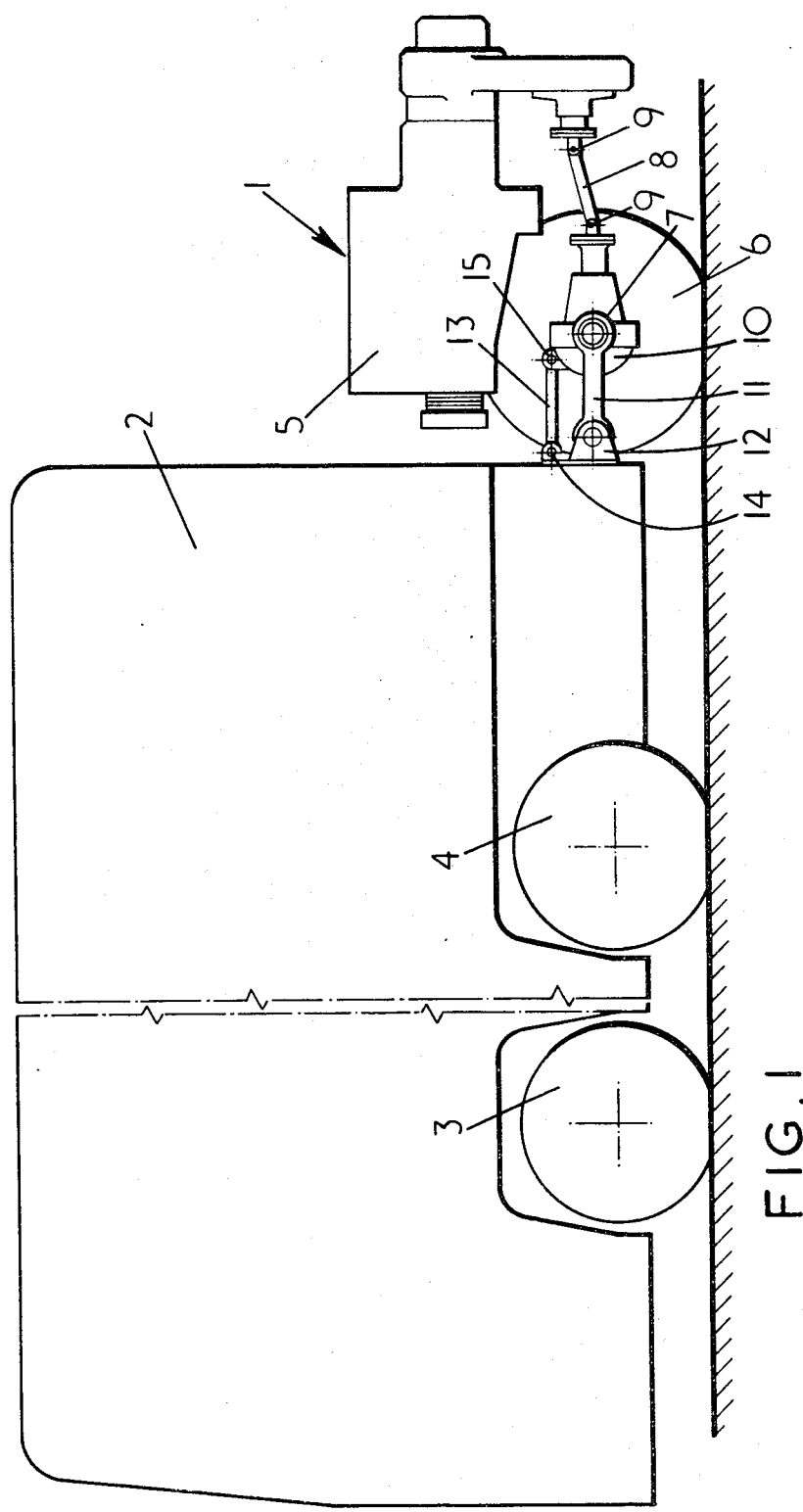
FIG. 1 is a partially cut away side view of a first embodiment of the present invention.
Figure 2:
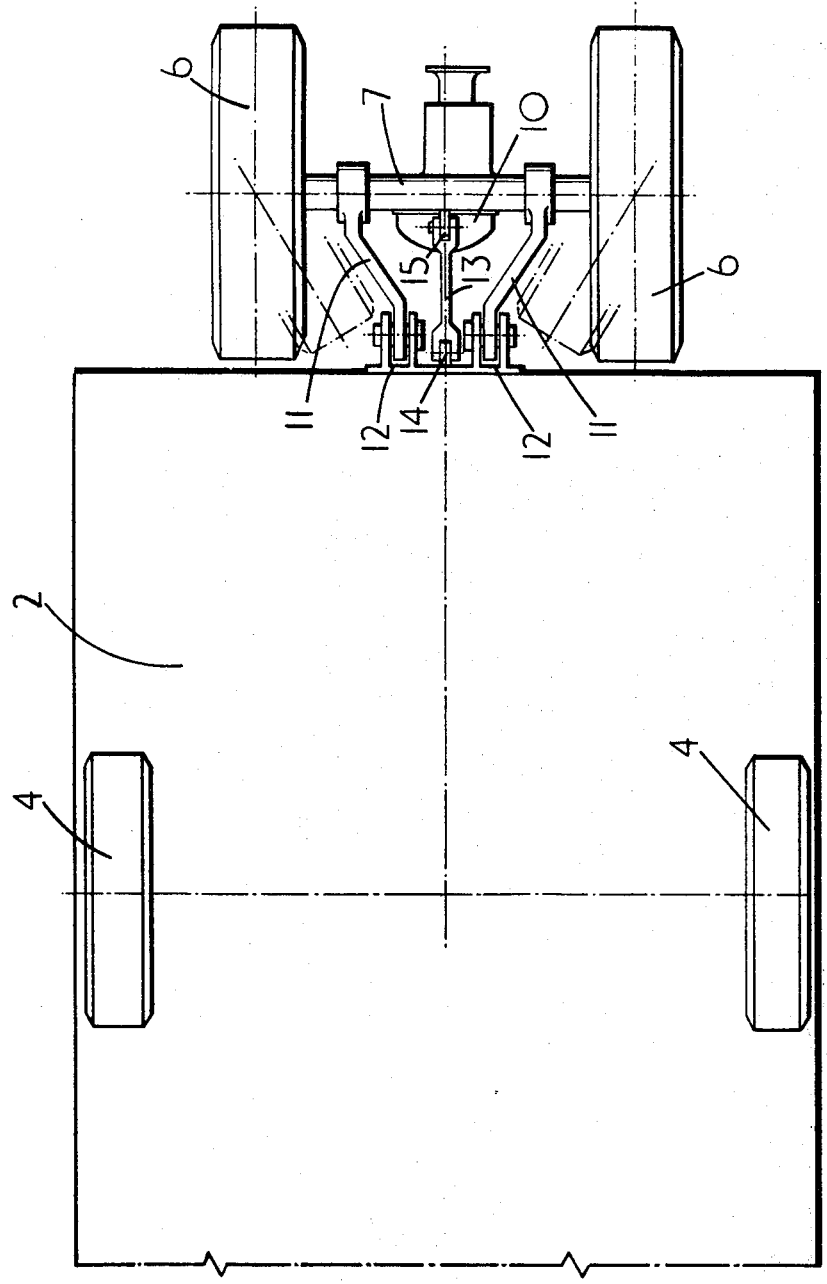
FIG. 2 is a cut away plan view of the first embodiment.

With reference to FIGS. 1 and 2, a bus is shown which comprises a wheeled motive power unit 1 coupled to a steerable body 2 having front and rear wheels 3 and 4 respectively. A power unit 5 is supported between wheels 6 above an axle 7. The power unit 5 is adapted to power the wheels 6 through a suitable transmission comprising a shaft 8, provided at each end with universal joints 9, and a differential 10.

The axle 7 is pivotally connected to a pair of coupling arms 11 which are in turn pivotally connected to brackets 12 on the body 2. The coupling arms 11 may be of any suitable configuration, for example that illustrated. A further arm 13 is pivotally connected at 14 and 15 to the body 2 and differential 10 respectively.

The wheels 6 may be pivoted with respect to the axle 7 for steering purposes. The means (not shown) for steering the wheels 6 may be of any suitable kind. The maximum-lock position of each wheel 6 is shown in dot-dash lines in FIG. 2.

It will be appreciated that as the wheeled motive power unit 1 is detachable from the body 2 by disconnecting the arms 11, 13 it can be easily replaced if an item of equipment therein develops a fault.

Figure 3:
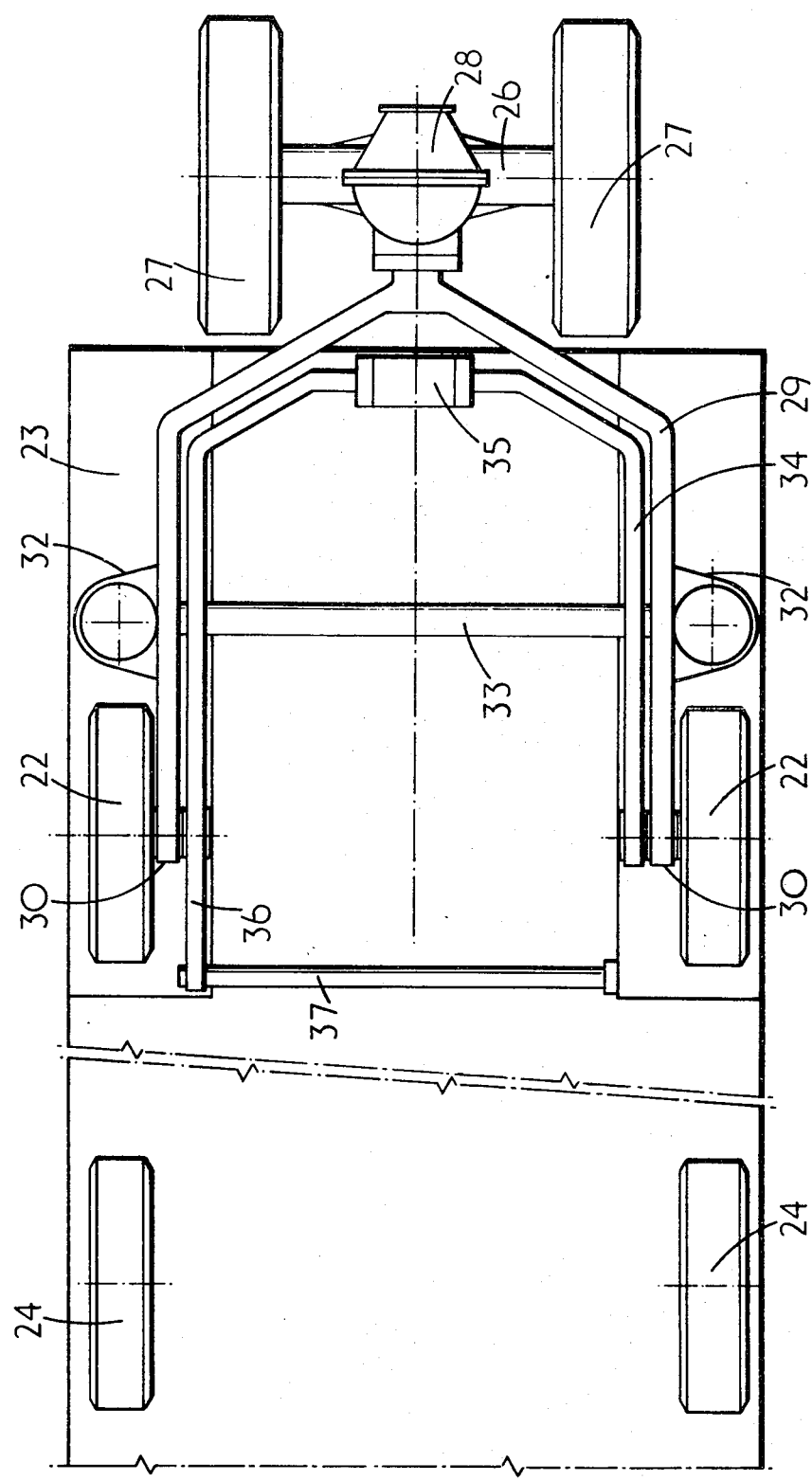
FIG. 3 is a plan view of the suspension of a second embodiment of the present invention.
Figure 4:
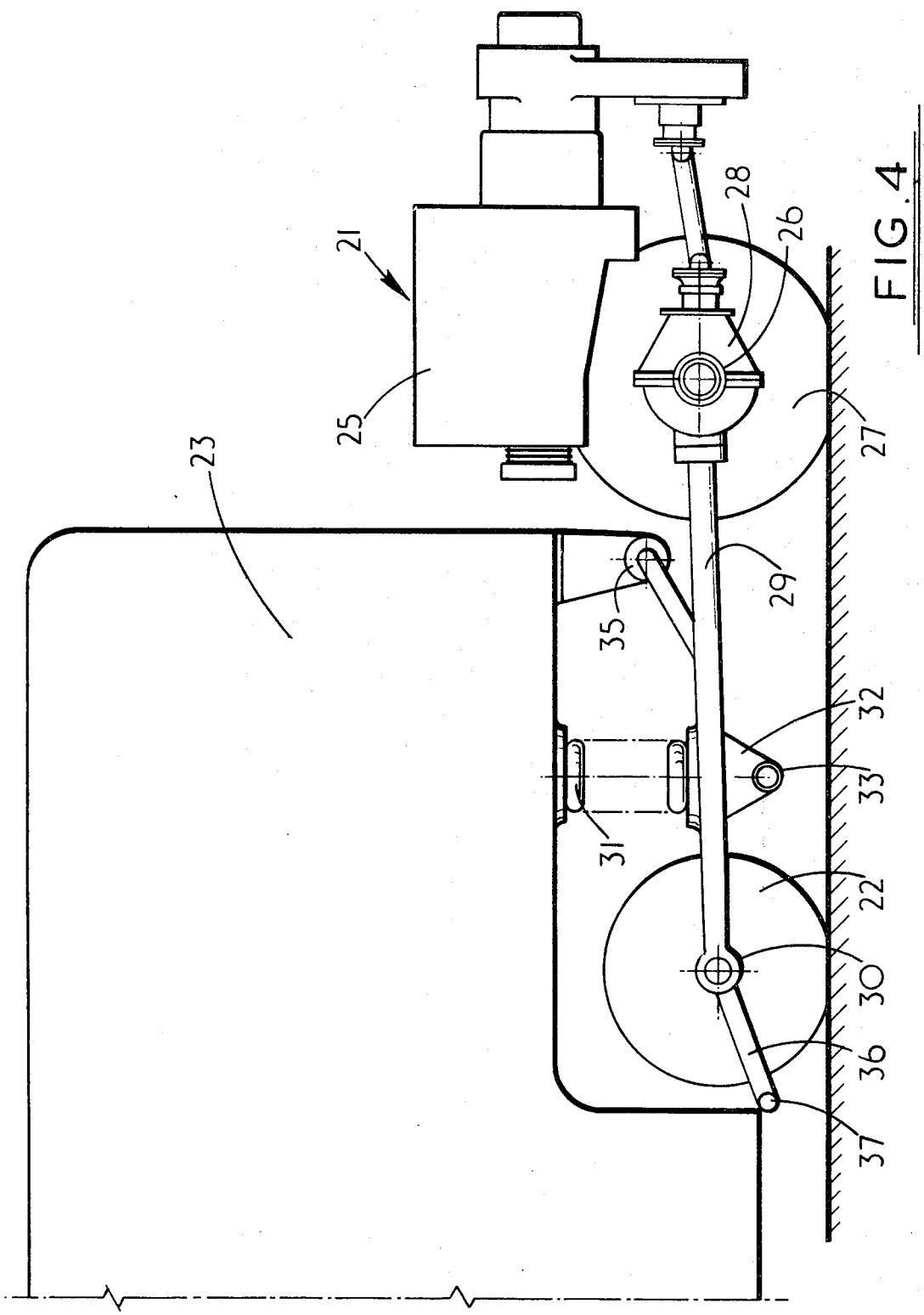
FIG. 4 is a cut away side view of the suspension of the second embodiment.

Referring to FIGS. 3 and 4 the second embodiment of the invention is provided with a wheeled motive power unit 21 coupled to the rear wheels 22 of a steerable body 23, the body 23 having front wheels 24. A power unit 25 is mounted above an axle 26 between a pair of wheels 27, the transmission for delivering power from unit 25 to the wheels 27 being similar to that described in connection with the first embodiment and comprising a differential 28.

A first U-shaped suspension arm 29 is rigidly connected to the differential 28 and pivoted at each of its ends 30 about the axis of the rear wheels 22. A respective air suspension unit 31 is arranged between the body 23 and a bearing member 32 located on each limb of the first suspension arm 29. The bearing members 32 are connected by a tie-bar 33.

A second U-shaped suspension arm 34 is pivotally mounted in a bearing 35 connected on the underside of the body 23. Each limb of the second suspension arm is pivotally mounted about the same pivots as the first suspension arm 29, one of the limbs of the second suspension arm terminating at this pivot, the other limb being provided with an extension 36. The end of the extension 36 is connected to the end of a Panhard rod 37 which extends across the underside of the body 23, and is secured thereto at its end.

As in the first embodiment, the wheels 27 of the wheeled motive power unit may be steered by means not shown.

Referring to FIGS. 5 and 6, a steering unit is shown which comprises a steering wheel 41 located forward of front wheels 42 of a passenger accommodating body which is connected by means not shown to a wheeled motive power unit, only the wheels 43 of which are shown. A conventional linkage 44 is provided between the steering wheel 41 and a first steering box 45 which is itself connected by a shaft 46 to a second steering box 47. Each steering box 45, 47 is connected by rods 48 to the wheels 42, 43 respectively. The rear wheels 49 of the passenger accommodating body are not steerable.

Referring to FIG. 7 the steering boxes 45 and 47, shown in FIGS. 5 and 6 are their associated linkages, are adapted to steer the wheels 42 and 43 so that the axes of rotation of these four wheels intersect at a point which lies on the axis of rotation of the rear wheels 49 of the passenger accommodating body. This ensures that each of the six wheels can rotate without sliding when the bus negotiates a curve.

It will be appreciated that the invention facilitates servicing in that the equipment in the motive power unit is more accessible than it would be on a conventional bus.

Although in each described embodiment the motive power unit is steerable, it may be non-steerable and articulated to the wheeled passenger accommodating body to give a smaller swept circle than would otherwise be possible.

It will be appreciated that the passenger accommodation body of embodiments of the invention may have one or more axles, depending upon the load characteristics.

What is claimed is:

1. A bus having a wheeled steerable body for accommodating a driver and passengers, a steerable wheeled motive power unit, and coupling means coupling the motive power unit to the rear of the body whereby the power unit may move relative to the body only in a substantially vertical direction the coupling means comprising first and second U-shaped suspension arms the ends of each limb of each of which are pivotal about the axis of rotation of the rear wheels of the steerable body, a pair of spring means arranged between the steerable body and respective ones of the limbs of the first suspension arm, an extension arm extending from the end of one of the limbs of the second suspension arm, and a transverse rod connected at one end to the free end of the extension and at the other to the steerable body, the second suspension arm being pivotally connected intermediate its ends to the underside of the steerable body.

2. A bus according to claim 1, wherein the spring means comprise air suspension units.

* * * * *